US012199891B2

(12) United States Patent
Jones et al.

(10) Patent No.: US 12,199,891 B2
(45) Date of Patent: *Jan. 14, 2025

(54) OPTIMIZING UPLINK BAND SCHEDULING OF CONTIGUOUS AND NON-CONTIGUOUS FREQUENCY RANGE 1 (FR1) AND FREQUENCY RANGE 2 (FR2) SPECTRUM

(71) Applicant: T-Mobile USA, Inc., Bellevue, WA (US)

(72) Inventors: David Jones, Bellevue, WA (US); Anokhi Shah, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/595,062

(22) Filed: Mar. 4, 2024

(65) Prior Publication Data

US 2024/0204933 A1 Jun. 20, 2024

Related U.S. Application Data

(63) Continuation of application No. 17/068,287, filed on Oct. 12, 2020, now Pat. No. 11,956,165.

(51) Int. Cl.
*H04L 5/00* (2006.01)
*H04L 5/14* (2006.01)
*H04W 72/1273* (2023.01)

(52) U.S. Cl.
CPC ............ *H04L 5/001* (2013.01); *H04L 5/0041* (2013.01); *H04L 5/1469* (2013.01); *H04W 72/1273* (2013.01)

(58) Field of Classification Search
CPC ..... H04L 5/001; H04L 5/0041; H04L 5/1469; H04L 5/0044; H04L 5/0094; H04W 72/1273; H04W 72/21; H04W 72/23
See application file for complete search history.

(56) References Cited

U.S. PATENT DOCUMENTS

| 11,956,165 | B2 | 4/2024 | Jones et al. | |
|---|---|---|---|---|
| 2015/0092703 | A1* | 4/2015 | Xu | H04W 28/18 370/329 |
| 2015/0156764 | A1 | 6/2015 | Yang et al. | |

(Continued)

FOREIGN PATENT DOCUMENTS

| WO | WO-2016130076 A1 * | 8/2016 |
|---|---|---|
| WO | 2020028089 A1 | 2/2020 |

OTHER PUBLICATIONS

European Application No. 21201995.4, Search Report mailed Feb. 22, 2022, 10 pages.

(Continued)

*Primary Examiner* — Hardikkumar D Patel

(57) ABSTRACT

This disclosure describes techniques that enable a carrier aggregation of two or more carrier available carriers for uplink transmissions at a base station node. More specifically, a carrier aggregation controller may receive a resource allocation request from a base station node that is associated with an uplink transmission of user plane data from a client device. The carrier aggregation controller may determine a carrier aggregation for the uplink transmission and generate scheduling information for delivery to the base station node that is based at least in part on the carrier aggregation.

20 Claims, 6 Drawing Sheets

(56) References Cited

U.S. PATENT DOCUMENTS

| | | | |
|---|---|---|---|
| 2018/0086452 A1* | 3/2018 | Hunt | G06Q 10/0835 |
| 2018/0270815 A1 | 9/2018 | Bala et al. | |
| 2019/0174346 A1* | 6/2019 | Murray | H04B 7/0408 |
| 2019/0349061 A1 | 11/2019 | Cirik et al. | |
| 2020/0314747 A1 | 10/2020 | Zhou et al. | |
| 2022/0067757 A1* | 3/2022 | Dravneek | G06N 5/02 |

OTHER PUBLICATIONS

U.S. Appl. No. 17/068,287, Office Action mailed Jun. 8, 2023, 42 pages.
U.S. Appl. No. 17/068,287, Notice of Allowance mailed Dec. 4, 2023, 9 pages.

* cited by examiner

OPTIMIZING UPLINK BAND SCHEDULING OF CONTIGUOUS AND NON-CONTIGUOUS FREQUENCY RANGE 1 (FR1) AND FREQUENCY RANGE 2 (FR2) SPECTRUM

CROSS-REFERENCE TO RELATED APPLICATION

This application is a continuation of and claims priority under 35 U.S.C. § 120 to U.S. application Ser. No. 17/068,287 filed on Oct. 12, 2020, entitled "Optimizing Uplink Band Scheduling of Contiguous and Non-Contiguous Frequency Range 1 (FR1) and Frequency Range 2 (FR2) Spectrum" by David Jones, et al., which is incorporated herein by reference for all purposes.

BACKGROUND

Present-day, telecommunication service providers rely on carrier aggregation of Orthogonal Frequency Division Multiplexing (OFDM) carriers to improve data rates for downlink transmissions. Downlink transmissions are progressively necessitating higher and higher throughput rates. Rather than expanding the carriers available to service downlink transmissions, carrier aggregation allows for the optimized use of existing carriers.

However, as new services are constantly provided, higher and higher uplink throughput rates are also required. Uplink throughputs rely on the available bandwidth of a primary carrier. A low uplink throughput of the primary carrier may adversely impact a QoS associated with a client device, even though uplink resources of other carrier bands serviced by the same base station node remain underutilized.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
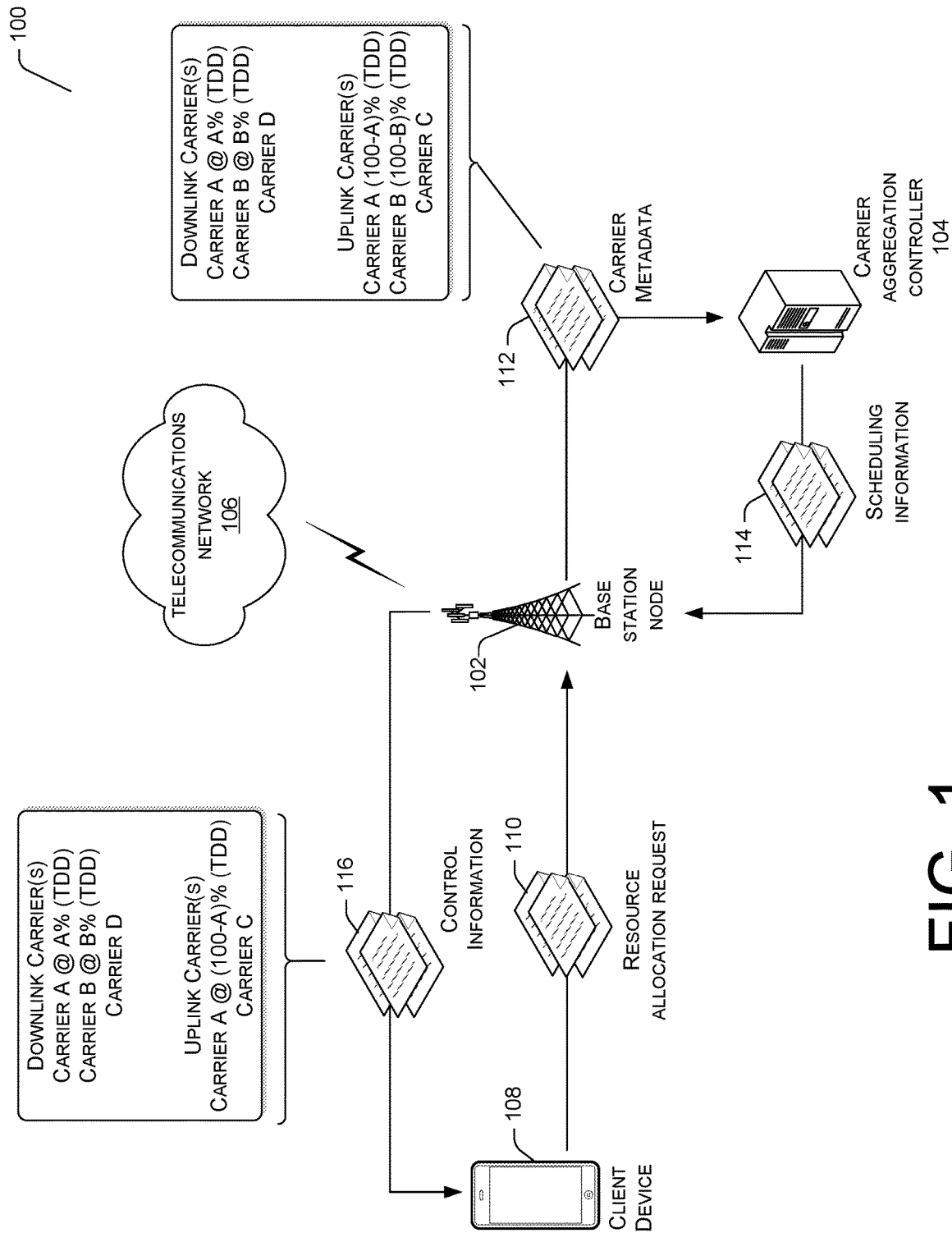
FIG. 1 illustrates a computing environment that facilitates the operation of a carrier aggregation controller.

This disclosure describes techniques that employ carrier aggregation for uplink transmissions initiated by a client device. Carrier aggregation is a technique used in wireless communications to increase the data rate per client device by assigning frequency blocks, also known as carrier components, to the same client device. The data throughput for a client device becomes a function of the aggregate data throughput of the carrier components. As more frequency blocks are aggregated, provided each has available bandwidth, the data throughput for the client device increases by a relative proportion. Accordingly, this disclosure describes a carrier aggregation controller that is configured to detect a resource allocation request for an uplink transmission of user plane data and generate scheduling information for carrier aggregation of available carriers to support the uplink transmission.

The carrier aggregation may include intra-band aggregation, inter-band aggregation, or a combination of both. Intra-band aggregation refers to an aggregation of contiguous or non-contiguous carrier components within the same carrier. Non-contiguous carrier components, unlike contiguous carrier components, are frequency blocks within the same carrier that are separated by a gap. Inter-band aggregation refers to an aggregation of carrier components in different carriers. Carrier aggregation may include the aggregation of carrier components within the same radio interface technology (RAT), such as 2G, 3G, Long-Term Evolution (LTE), or 5G-New Radio (5G-NR). Alternatively, or additionally, aggregation may include the aggregation of carrier components within different RATs. In the latter example, aggregation for 5G-NR may occur within a non-stand-alone (NSA) computing environment, which involves leveraging the infrastructure of one Radio Interface Technology (RAT) to support transmissions via another RAT. An NSA computing environment may occur when deploying a 5G-NR, in a new marketplace (i.e. geographic region). While the 5G-NR infrastructure (i.e. gNodeBs and 5GCs) is being built, the telecommunications service provider may choose to leverage the use of existing LTE infrastructure (i.e. eNodeBs and EPCs) to provide LTE and 5G-NR coverage in areas where 5G-NR infrastructure is lacking.

The carrier aggregation controller may be communicatively coupled to a base station node to detect and intercept resource allocation requests from client devices that reside within a service area of the base station node. The resource allocation request may include a client device identifier associated with a client device and an indication of user plane data that is to be transmitted via the base station node to a telecommunications network. The carrier aggregation controller may coordinate with the base station node to determine a carrier aggregation of available carrier components. In this way, the base station node, via instruction from the carrier aggregation controller, may schedule resource allocations within the carrier components that collectively account for an entirety of the uplink transmission of the user plane data.

The carrier aggregation may comprise of two or more available carrier components, such as 5G-NR frequency blocks and LTE frequency blocks. The carrier components may be intra-band contiguous carrier components, intra-band non-contiguous carrier components, inter-band carrier components, or any combination thereof.

The carrier aggregation controller may retrieve carrier metadata from each available carrier supported at the base station node. The carrier metadata may include an indication of the uplink physical and control resource utilization associated with each available carrier. For example, carrier metadata for an LTE carrier may include physical uplink share channel (PUSCH) and packet uplink control channel (PUCCH) utilization. In this way, the carrier aggregation controller may determine a carrier aggregation of two or more carrier components of the available carriers for an uplink transmission of user plane data based at least in part on the analysis of uplink resource utilization associated with each available carrier.

In a non-limiting example, the carrier aggregation controller may intercept a resource allocation request received at a base station node to upload user plane data to a telecommunications network. The carrier aggregation controller may analyze the resource allocation request to determine an anticipated network usage associated with the uplink transmission. Anticipated network usage may be defined as a required bandwidth or a number of physical resource blocks (PRBs) needed to transmit the user plane data. A PRB is a minimum resource allocation, which by way of example, occupies 180 kHz within the LTE spectrum.

In doing so, the carrier aggregation controller may determine a carrier aggregation of available carriers, based on real-time resource utilization of the available carriers and the anticipated network usage of the uplink transmission. By way of example, the carrier aggregation may include carriers within Frequency Range 1 (FR1) and Frequency Range (FR2) frequency bands. FR1 bands are traditionally used by air-interface technologies, such as LTE. Frequency bands between 24.25 GHz to 52.6 GHz are designated as Frequency Range 2 (FR2). FR2 bands are within the millimeter-wave range, meaning these frequencies have a shorter range but generally higher available bandwidth relative to FR1.

Additionally, the carrier aggregation may include carriers that employ frequency division duplexing (FDD) technology and/or time division duplexing (TDD) technology in order to use the same set of frequencies for uplink and downlink transmissions. TDD may be asymmetric and a different amount of spectrum can be used for downlink transmissions and uplink transmissions. For example, a carrier with TDD technology may dedicate 85% of its set of resources for downlink transmissions and 15% for uplink transmissions. Referring to the above frequency band examples, TDD technologies may be employed within select frequency bands of FR1 and FR2. For example, TDD technology may be employed at 2500 MHz (i.e. band designation n41) of FR1 and 28 GHz and 39 GHz (band designations n261 and n260, respectively) of FR2.

Therefore, with regards to carriers that employ TDD technology, the carrier aggregation controller may identify the TDD ratio of downlink transmissions relative to uplink transmissions, and in doing so, analyze available uplink transmission resources, based on the TDD ratio.

The carrier aggregation controller may employ one or more machine-learning algorithms to infer a carrier aggregation for an uplink transmission of user plane data. The one or more trained machine-learning algorithms may make use of techniques such as supervised learning, unsupervised learning, semi-supervised learning, naive Bayes, Bayesian network, decision trees, neural networks, fuzzy logic models, and/or probabilistic classification models.

In a non-limiting example, consider a client device that is assigned a primary carrier for uplink transmissions. Here, the carrier aggregation controller may analyze carrier metadata associated with the primary carrier and determine a Quality of Service (QoS) associated with the primary carrier. The QoS may correspond to indications of packet loss, latency, jitter, echo, uplink throughput, or any combination thereof. In response to the QoS being less than a predetermined QoS threshold, the carrier aggregation controller may determine the carrier aggregation for the uplink transmission. In contrast, if the QoS is greater than or equal to the predetermined QoS threshold, the carrier aggregation controller may forgo generating the carrier aggregation and instead rely on the primary carrier for the uplink transmission of user plane data. The predetermined QoS threshold may be set by an administrator of the carrier aggregation controller, an operator of the telecommunications network, or via a service priority associated with the client device.

In some examples, a service priority may be set by a Service Level Agreement (SLA) associated with the client device or other contractual mechanism. The service priority may act to trigger and/or prioritize a carrier aggregation for a client device based at least in part on a predetermined QoS threshold.

Moreover, the carrier aggregation controller may determine a carrier aggregation based at least in part on radio signal measurements of available carriers at the base station node, such as, but not limited to, a Reference Signal Received Power (RSRP) and/or Reference Signal Received Quality (RSRQ).

The RSRP is a measurement of the power present in a received radio signal for telecommunications networks, such as an LTE or 5G-NR network. More specifically, RSRP measures the power of LTE reference signals spread over the full bandwidth and narrow band. An RSRP that is greater than −80 dBm may indicate excellent signal strength with maximum data throughput rates. In contrast, an RSRP that is less than −110 dBm may indicate no signal strength. More granular RSRP measurements between −80 dBm and −110 dBm represent good, fair, and fair to poor signal strengths.

The RSRQ is a measurement of the quality of the received radio signal for telecommunications networks, such as an LTE or 5G-NR network. In some examples, the RSRQ may provide additional information when RSRP is not sufficient to make a reliable handover or cell selection decision. An RSRQ that is greater than −10 dB may indicate excellent signal strength with maximum data throughput rates. In contrast, an RSRQ that is less than −20 dB may indicate no signal strength. More granular RSRQ measurements between −10 dB and −20 dB represent good, fair, and fair to poor signal strengths.

In this example, in response to determining that a carrier aggregation is to occur, the carrier aggregation controller may analyze the RSRP and/or RSRQ of available carriers and determine the carrier aggregation based on the relative RSRPs of available carriers.

Additionally, the carrier aggregation controller may employ one or more trained machine-learning algorithms to generate data models to infer whether to implement a carrier aggregation for uplink transmissions based on anticipated network usage, determine a combination of carrier components for a carrier aggregation based on carrier resource utilization, or a combination of both.

In a first example, the carrier aggregation controller may employ one or more trained machine-learning algorithms to generate a network usage data model based on historical instances of network usage at the base station node over a predetermined time interval. The historical instances of network usage may include at least the resource allocation (i.e. number of PRBs) required for uplink transmissions and whether the primary carrier or a carrier aggregation was used for the uplink transmission. In this regard, the carrier aggregation controller may correlate real-time anticipated network usage (i.e. based on a resource allocation request) with the network usage data model to infer whether a carrier aggregation of carrier components is required for the uplink transmission. The network usage data model may be used to further infer a combination of carrier components to develop the carrier aggregation. As more historical network usage data becomes available, the carrier aggregation controller may continuously update the network usage model so that a more accurate model is developed.

In a second example, the carrier aggregation controller may employ one or more trained machine-learning algorithms to generate a carrier utilization data model based on historical instances of carrier resource utilization at a base station node over a predetermined time interval. The historical instances of carrier resource utilization may include at least an indication of resource allocation dedicated for given network usage, corresponding QoS, corresponding RSRPs, or any combination thereof. Carrier resource utilization may indicate instances of carrier aggregation, along with their respective carrier component identifiers, used to support uplink transmissions over the predetermined time interval. In this regard, the carrier aggregation controller may correlate real-time carrier resource utilization with the carrier utilization data model to infer the make-up of a carrier aggregation for an uplink transmission. The carrier utilization data model may be used to further infer whether the primary carrier of a client device or a carrier aggregation is required for the uplink transmission. As more historical carrier resource utilization data becomes available, the carrier aggregation controller may continuously update the carrier utilization data model so that a more accurate model is developed.

Further, the carrier aggregation controller may use the carrier utilization data model to infer an updated TDD ratio for carriers that employ the TDD technology. For example, the carrier utilization data model may identify a particular carrier with a current TDD ratio of downlink transmissions relative to uplink transmissions. The carrier aggregation controller may further analyze historical instances of carrier resource utilization to infer a likely network load for downlink and uplink transmissions of the particular carrier. An inference of the likely network load may be based at least in part on the carrier utilization data model.

Moreover, the carrier aggregation model may infer an updated TDD ratio that accommodates downlink and uplink transmission loads. In this way, the available spectrum of the particular carrier is more fully utilized between downlink and uplink transmissions, based on the inferred likely network load. Moreover, the carrier aggregation controller may generate a recommendation for delivery to the base station node to adjust the current TDD ratio to the updated TDD ratio.

In a third example, the carrier aggregation controller may be configured to aggregate the inferences from each of the network usage data model and the carrier utilization data model to generate a meta-model. In this regard, the meta-model may be configured to analyze network usage associated with a resource allocation request to infer whether to use a carrier aggregation for the uplink transmission, based at least in part on the real-time network usage of a resource allocation request, and in response to inferring that a carrier aggregation is warranted, further inferring a selection of carrier components to make up the carrier aggregation. Similar to the earlier referenced data models, as more network usage and carrier utilization data becomes available, the carrier aggregation controller may continuously update the meta-data model so that a more accurate model is developed.

It is noteworthy that the terms "carrier" and "carrier component" may be used interchangeably throughout this disclosure. Further, the term "techniques," as used herein, may refer to system(s), method(s), computer-readable instruction(s), module(s), algorithms, hardware logic, and/or operation(s) as permitted by the context described above and through the document.

FIG. 1 illustrates a computing environment that facilitates the operation of a carrier aggregation controller. The computing environment 100 may include a base station node 102 and a carrier aggregation controller 104. The base station node 102 is responsible for handling voice and data traffic associated with a telecommunications network 106. The telecommunications network 106 may correspond to one of 2G, 3G, Long-term Evolution (LTE), or 5G-New Radio (5G-NR) network.

The base station node 102 is configured to support one or more available carriers within its service area. The one or more available carriers may comprise of 2G, 3G, Long-term Evolution (LTE), or 5G-New Radio (5G-NR) radio access technologies.

In the illustrated example, the carrier aggregation controller 104 is communicatively coupled to the base station node 102 via one or more networks. In other examples, the carrier aggregation controller 104 may reside within the base station node 102.

The carrier aggregation controller 104 may be configured to detect and intercept a resource allocation request initiated by a client device 108 within a service area of the base station node 102. The resource allocation request 110 may include a client device identifier associated with the client device and an indication of user plane data that is to be transmitted to the telecommunications network 106. In one example, the resource allocation request 110 may also include a service priority that is associated with the client device 108. The service priority may indicate a guaranteed bandwidth threshold or a guaranteed QoS threshold for uplink transmissions associated with the corresponding client device. In another example, the resource allocation request 110 may not include the service priority. Instead, the carrier aggregation controller 104 may use the client device identifier from the resource allocation request 110 to retrieve a client profile. The carrier aggregation controller 104 may further interrogate the client profile to determine whether a service priority exists.

The carrier aggregation controller 104 may analyze the resource allocation request 110 to determine an anticipated network usage for the uplink transmission.

Further, the carrier aggregation controller 104 may retrieve carrier metadata 112 from the base station node 102 to determine real-time uplink physical and control resource utilization for each available carrier. The carrier metadata 112 may identify the available carriers at the base station node 102, and further indicate whether the available carriers are dedicated as downlink resources, uplink resources, or a combination of both (i.e. carriers that employ TDD technology). In the illustrated example, the carrier metadata 112 indicates that Carrier D is dedicated to downlink transmissions and Carrier C is dedicated to uplink transmissions. Carriers A and B each employ TDD technology, and thus are dedicated to downlink and uplink transmissions based on their respect TDD ratio (downlink/uplink ratio). For Carrier A, the TDD ratio corresponds to A %/(100–A) % and for Carrier B, the TDD ratio corresponds to B %/(100–B %).

Therefore, the carrier aggregation controller 104 may analyze the carrier metadata 112 given the anticipated network usage and determine whether to use a carrier aggregation for an uplink transmission or instead rely on the primary carrier associated with the client device. In doing so, the carrier aggregation controller 104 may generate scheduling information 114 for delivery to the base station node 102. The scheduling information 114 may identify a carrier aggregation, if implemented, along with the carrier components of the carrier aggregation. In some examples, the scheduling information may include control information 116 that is intended for the client device 108. The control information may configure the client device 108 to use allocated carrier aggregation for the uplink transmission. Alternatively, the control information 116 may be generated at the base station node 102, based at least in part on the scheduling information 114.

In the illustrated example, the scheduling information dedicates Carrier C and the uplink resources of Carrier A (based on the TDD ratio of Carrier A) for uplink transmissions to the telecommunications network 106.

The carrier aggregation controller 104 may operate on one or more distributed computing resource(s). The one or more distributed computing resource(s) may include one or more computing device(s) that operate in a cluster or other configuration to share resources, balance load, increase performance, provide fail-over support or redundancy, or for other purposes. The one or more computing device(s) may include one or more interfaces to enable communications with other networked devices, such as the client device 108 via one or more network(s).

The one or more network(s) may include public networks such as the Internet, private networks such as an institutional and/or personal intranet, or some combination of private and public network(s). The one or more network(s) can also include any type of wired and/or wireless network, including but not limited to local area network (LANs), wide area network(s) (WANs), satellite networks, cable networks, Wi-Fi networks, Wi-Max networks, mobile communications networks (i.e. 5G-NR, LTE, 3G, 2G), or any combination thereof.

Moreover, the client device 108 may include any sort of electronic device, such as a television unit, a multimedia streaming device, a cellular phone, a smartphone, a tablet computer, an electronic reader, a media player, a gaming device, a personal computer (PC), a laptop computer, Internet of Things (IoT) devices (i.e. sensors, etc.). The client device 108 may also include network devices that act as intermediaries between the client device 108 that execute user applications and the Internet. It is noteworthy that the Internet is accessible via one or more network(s). In some examples, the client device 108 may include a subscriber identity module (SIM), such as an eSIM, to identify the client device 108 to a telecommunication service provider (also referred to herein, as "telecommunications network").

Figure 2:
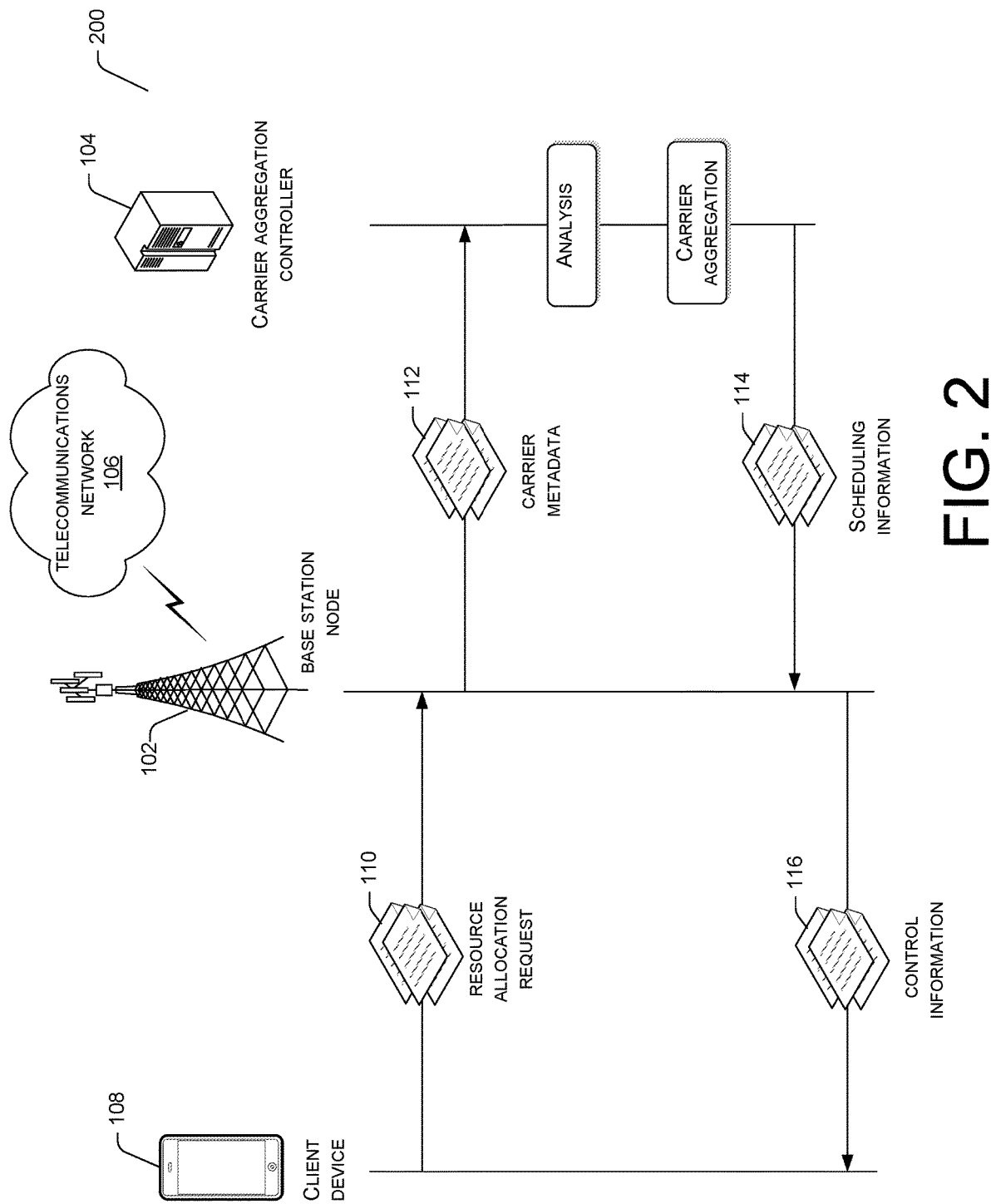
FIG. 2 illustrates a block diagram of a carrier aggregation controller analyzing a resource allocation request and carrier metadata to generate scheduling information associated with carrier aggregation.

FIG. 2 illustrates a block diagram of a carrier aggregation controller analyzing a resource allocation request and carrier metadata to generate scheduling information associated with a carrier aggregation. In the illustrated example, the client device 108 may transmit a resource allocation request 110 to the base station node 102 for an uplink transmission of user plane data to the telecommunications network 106. The carrier aggregation controller 104 detect and intercept the resource allocation request 110 from the base station node 102, and further retrieve carrier metadata 112 from the base station node 102.

Further, the carrier aggregation controller 104 may analyze the resource allocation request 110 to determine anticipated network usage of the user plane data, and further, analyze the carrier metadata 112 to determine real-time resource utilization of available carriers at the base station node 102.

In doing so, the carrier aggregation controller 104 may determine whether to use a carrier aggregation for the uplink transmission or instead rely on the primary carrier associated with the client device 108. In doing so, the carrier aggregation controller 104 may generate scheduling information 114 for delivery to the base station node 102. The scheduling information 114 may identify the carrier aggregation, if implemented, along with its carrier components. In some examples, the scheduling information 114 may include control information 116 that is intended for the client device 108. In the illustrated example, the control information 116 may be generated at the base station node 102, based at least in part on the scheduling information. Alternatively, the scheduling information 114 may include the control information 116 that is intended for the client device 108. In this latter example, the base station node 102 may forward the control information 116 to the client device 108, or the carrier aggregation controller 104 may transmit the control information 116 directly to the client device 108.

Figure 3:
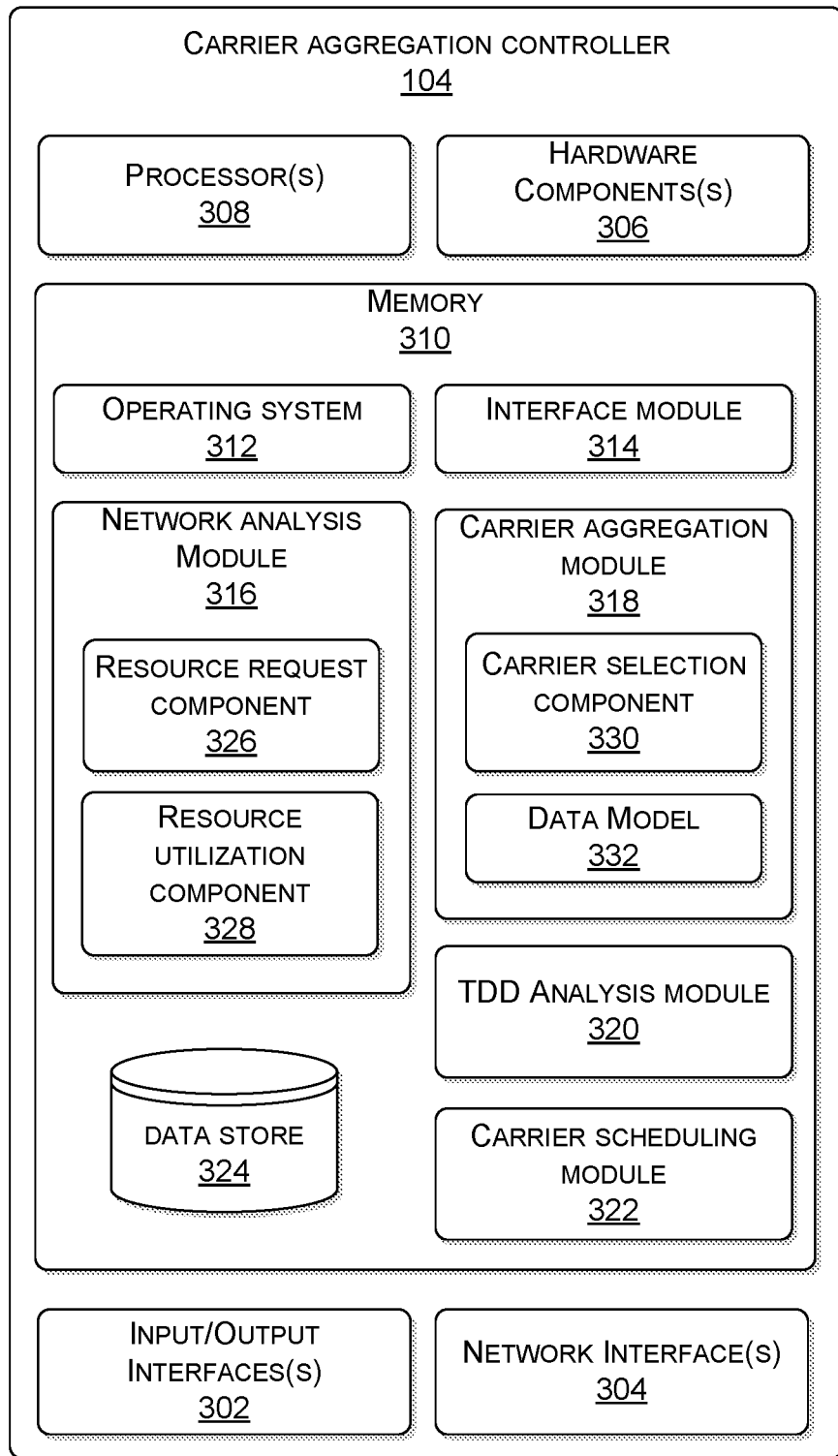
FIG. 3 illustrates various components of a carrier aggregation controller that is communicatively coupled to a base station node.

FIG. 3 illustrates various components of a carrier aggregation controller that is communicatively coupled to a base station node. The base station node may be configured to support one or more available carriers within its service area. Carriers may include 2G, 3G, LTE, and 5G-NR air-interface technologies. The carrier aggregation controller may monitor resource allocation requests at the base station node and infer whether to implement a carrier aggregation to support uplink transmissions to a telecommunications network and if so, infer the carrier components of the carrier aggregation. In some instances, the carrier aggregation controller may infer, or automatically implement, an update to a TDD ratio, or the introduction of a TDD ratio, to an existing carrier to balance underutilized resources for downlink transmissions relative to overutilized resources for uplink transmissions.

The carrier aggregation controller 104 may include input/output interface(s) 302. The input/output interface(s) 302 may include any type of output interface known in the art, such as a display (e.g. a liquid crystal display), speakers, a vibrating mechanism, or a tactile feedback mechanism. Input/output interface(s) 302 also include ports for one or more peripheral devices, such as headphones, peripheral speakers, or a peripheral display. Further, the input/output interface(s) 302 may further include a camera, a microphone, a keyboard/keypad, or a touch-sensitive display. A keyboard/keypad may be a push-button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the carrier aggregation controller 104 may include network interface(s) 304. The network interface(s) 304 may include any sort of transceiver known in the art. For example, the network interface(s) 304 may include a radio transceiver that performs the function of transmitting and receiving radio frequency communications via an antenna. Also, the network interface(s) 304 may include a wireless communication transceiver and a near-field antenna for communicating over unlicensed wireless Internet Protocol (IP) networks, such as local wireless data networks and personal area networks (e.g. Bluetooth or near field communication (NFC) networks). Further, the network interface(s) 304 may include wired communication components, such as an Ethernet port or a Universal Serial Bus (USB). Hardware component(s) 306 may include additional hardware interface, data communication hardware, and data storage hardware.

Further, the carrier aggregation controller 104 may include one or more processor(s) 308 that are operably connected to memory 310. In at least one example, the one or more processor(s) 308 may be a central processing unit(s) (CPU), graphics processing unit(s) (GPU), or both a CPU and GPU or any other sort of processing unit(s). Each of the one or more processor(s) 308 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 308 may also be responsible for executing all computer applications stored in the memory, which can be associated with common types of volatile (RAM) and/or non-volatile (ROM) memory.

In some examples, memory 310 may include system memory, which may be volatile (such as RAM), non-volatile (such as ROM, flash memory, etc.), or some combination of the two. The memory may also include additional data storage devices (removable and/or non-removable) such as, for example, magnetic disks, optical disks, or tape.

The memory 310 may further include non-transitory computer-readable media, such as volatile and nonvolatile, removable and non-removable media implemented in any method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 310 may include an operating system 312, an interface module 314, a network analysis module 316, a carrier aggregation module 318, a TDD analysis module 320, a carrier scheduling module 322, and a data store 324. The operating system 312 may be any operating system capable of managing computer hardware and software resources. The operating system 312 may include an interface layer that enables applications to interface with the input/output interface(s) 302 and the network interface(s) 304.

The interface module 314 may be configured to interface with the base station node and client devices within a service area of the base station node. More specifically, the interface module 314 may monitor receipt of resource allocation requests at the base station node. In response to detecting a resource allocation request, the interface module 314 may intercept and pull the resource allocation request. Further, the interface module 314 may retrieve carrier metadata from the base station node. The carrier metadata may correspond to carriers supported by the base station node.

The interface module 314 may also transmit scheduling information to the base station node. The scheduling information may indicate the carrier aggregation of carrier components for the uplink transmission of user plane data.

The network analysis module 316 may include a resource request component 326 and a resource utilization component 328. The resource request component 326 may be configured to determine an anticipated network usage associated with a resource allocation request. The anticipated network usage may be defined as a required bandwidth or a number of PRBs required to transmit the user plane data.

The resource request component 326 may further determine whether a service priority is associated with the resource allocation request. Here, the resource allocation request may include a client device identifier associated with the resource allocation request. In turn, the client device identifier may be used to retrieve a client profile associated with the client device from the telecommunications network, and further determine whether a service priority exists. The service priority may indicate a guaranteed bandwidth threshold or a guaranteed QoS threshold for uplink transmissions associated with the corresponding client device. Therefore, the existence of a service priority may influence the determination of anticipated network usage.

The resource utilization component 328 may analyze carrier metadata of carriers supported by the base station node. Carrier metadata may include indications of real-time uplink physical and control resource utilization for each available carrier. Analysis of the carrier metadata may include determining a QoS associated with each available carrier, determining an RSRP of the received radio signal of each available carrier, determining an RSRQ of the received radio signal of each available carrier, or a combination of both. The QoS may correspond to indications of packet loss, latency, jitter, echo, uplink throughput, or any combination thereof. The RSRP may be expressed as a dB measurement of the power of reference signals.

The carrier aggregation module 318 may further include a carrier selection component 330, and a data model component 332. The carrier selection component 330 may employ one or more machine-learning algorithms to first determine whether to use a carrier aggregation for an uplink transmission or instead to rely on the primary carrier associated with the client device. Here, the carrier selection component 330 may analyze the QoS and/or RSRP measurements of a primary carrier relative to a predetermined QoS threshold and/or a predetermined RSRP threshold, respectively. If at least one of the QoS and/or RSRP measurements of the primary carrier are below their respective predetermined thresholds, the carrier selection component 330 may infer that a carrier aggregation is required for the uplink transmission.

The carrier selection component 330 is further configured to determine a carrier aggregation of two or more carrier components of available carriers for an uplink transmission. The carrier components may be intra-band contiguous carrier components, intra-band non-contiguous carrier components, inter-band carrier components, or any combination thereof. As part of selecting a carrier aggregation, the carrier selection component 330 may analyze carrier metadata to ensure that the QoS and RSRP measurements of the carrier aggregation improve upon those of the primary carrier. Otherwise, the carrier aggregation is counterproductive.

The data model component 332 may be configured to a network usage data model, a carrier utilization data model, and a meta-data model. The network usage data model may be based on historical instances of network usage at the base station node over a predetermined time interval. The network usage data model may be used to primarily infer whether a carrier aggregation is required for an uplink transmission.

The carrier utilization data model may be based on historical instances of carrier resource utilization at a base station node over a predetermined time interval. The carrier utilization data model may be used to primarily infer a make-up (i.e. carrier components) of a carrier aggregation for an uplink transmission.

The meta-data model may be configured based on an aggregate of the network usage data model and the carrier utilization data model. In other words, the meta-data model is based on historical instances of network usage and historical instances of carrier resource utilization. In this way, the meta-data model may be used to infer whether a carrier aggregation is required for an uplink transmission and the make-up (i.e. carrier components) of the carrier aggregation.

The TDD analysis module 320 may employ one or more machine-learning algorithms to infer an updated TDD ratio for carriers that employ TDD technology, based at least in part on the data models generated by the data model component 332 and real-time carrier metadata received via the interface module 314. In some instances, a current TDD ratio for carriers may be skewed to favor downlink transmissions, which in turn may lead to an under-utilization of bandwidth dedicated for downlink transmissions and an over-utilization of bandwidth dedicated for uplink transmissions. The updated TDD ratio is intended to reduce the under-utilization of resources for downlink transmissions and reduce the over-utilization of resources for uplink transmissions.

In some examples, the TDD analysis module 320 may generate a confidence score based on the degree of under-utilization and over-utilization. For example, consider a carrier with a TDD ratio of 85%/15% (downlink/uplink). The TDD analysis module 320 may determine that 20% of the 85% of the downlink resources are being utilized, while the 15% portion of the uplink resources are being fully utilized. The carrier metadata may include indications of data latency for uplink transmissions, suggesting that the uplink resources are being over-utilized.

In this example, the TDD analysis module 320 may generate a confidence score based on the 65% under-utilized portion of the downlink resources and the full/over-utilization of the uplink resources. The confidence score may be alpha-numeric (i.e. 0 to 10, or A to F), descriptive, (i.e. low, medium, or high), based on color (i.e. green, yellow, or red), or any other suitable rating scale. A high confidence score (i.e. 7 to 10, high, red) indicates a major under-utilization of downlink resources and a full/over-utilization of uplink resources. For example, a high confidence score may be inferred for a carrier with a 75%+ under-utilization of downlink resources and full/over-utilization of uplink resources. A medium confidence score (i.e. 4 to 6, medium, yellow) may be inferred for a carrier with an approximately 50% under-utilization of downlink resources and full/near-full utilization of uplink resources. A low confidence score (i.e. 1 to 3, low, green) may be inferred for a carrier with approximately 25% under-utilization of downlink resources and near-full utilization of uplink resources.

The TDD analysis module 320 may be configured to determine whether to adjust a TDD ratio for a carrier, based on the confidence score. For high confidence scores, the TDD analysis module 320 may automatically adjust a TDD ratio for a carrier. For medium confidence scores, the TDD analysis module 320 may generate a recommendation, for delivery to an operator of the base station node, to adjust the TDD ratio. For low confidence scores, the current TDD ratio may be left unchanged.

The carrier scheduling module 322 may generate scheduling information that identifies a carrier aggregation, if implemented, for an uplink transmission of user plane data to the telecommunications network. The scheduling information may identify the carrier components of the carrier aggregation and include control information that is intended for client devices. The control information may configure the client device to use allocated carrier aggregation for the uplink transmission. Alternatively, the control information may be generated at the base station node, based at least in part on the scheduling information.

The data store 324 may include a repository of data model iterations developed over time, namely network usage data models, carrier utilization data models, and meta-data models. The data store 324 may further include historical instances of network usage, historical instances of carrier resource utilization, carrier metadata, client profiles along with corresponding service priorities, and any other data pertinent to an operation of the carrier aggregation controller 104.

Figure 4:
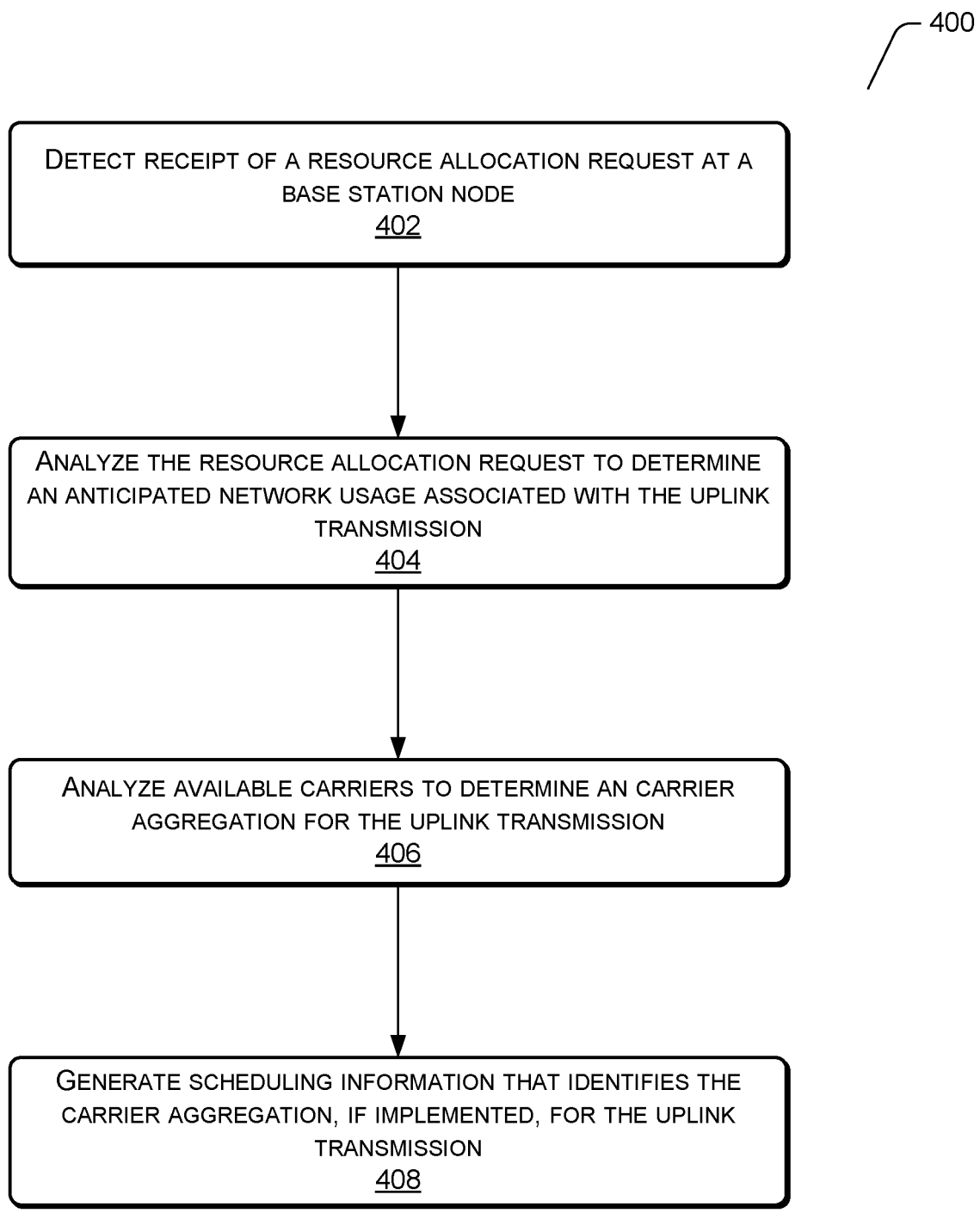
FIG. 4 illustrates a process for generating scheduling information to allocate a carrier aggregation for an uplink transmission of user plane data.
Figure 5:
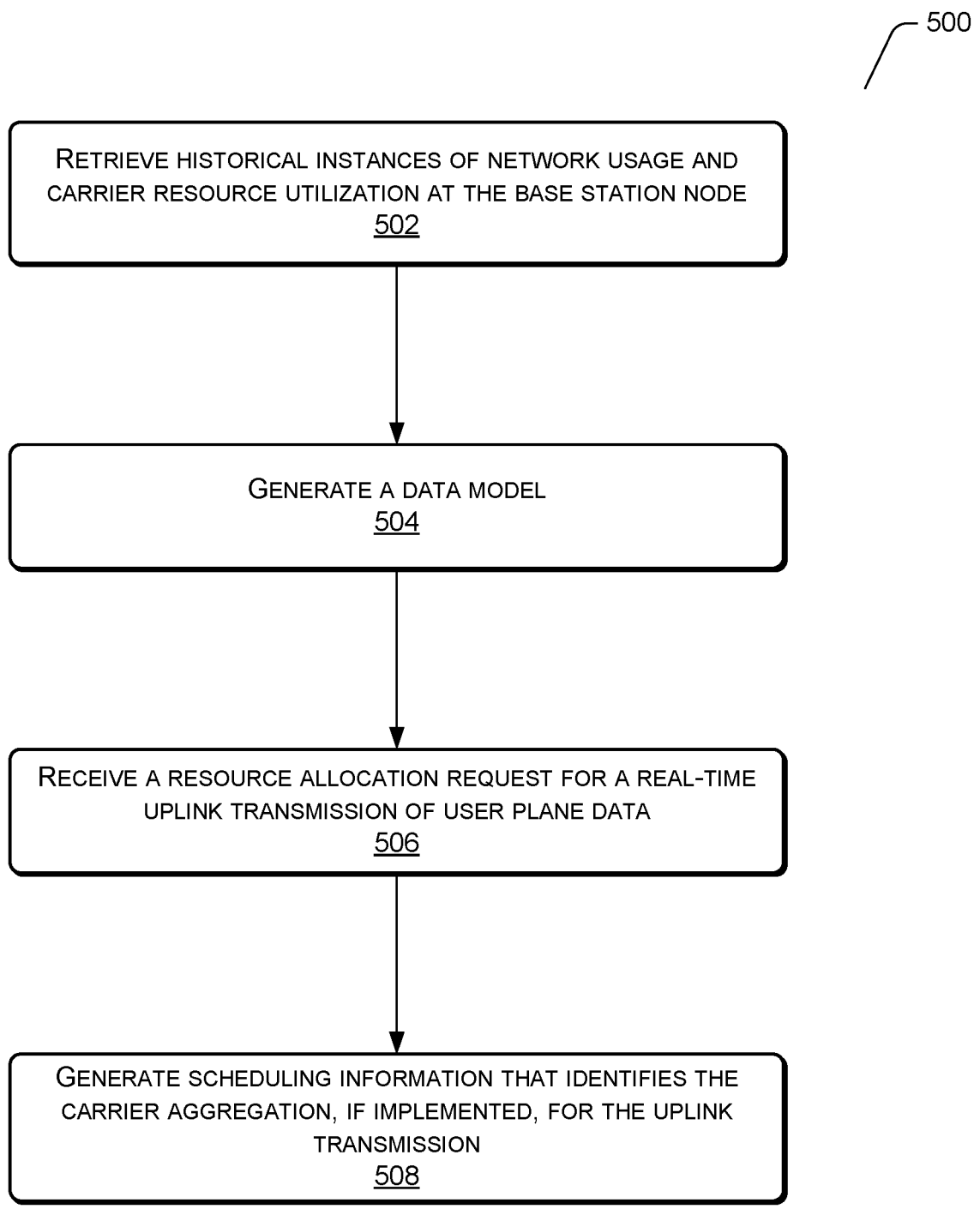
FIG. 5 illustrates a process for generating a data model to infer whether to generate a carrier aggregation for an uplink transmission of user plane data.
Figure 6:
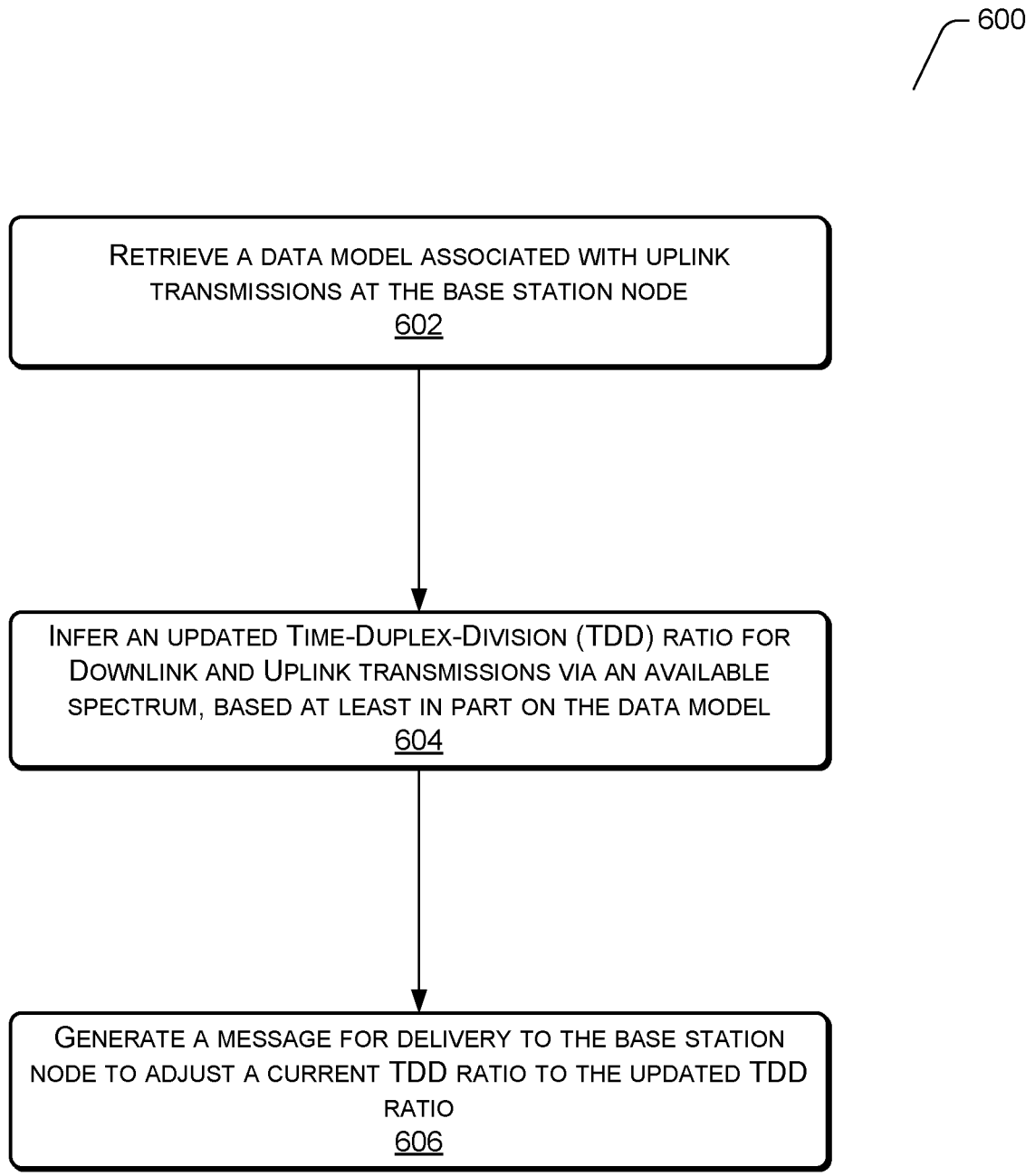
FIG. 6 illustrates a process for generating a recommendation to update a time division duplexing (TDD) ratio for a carrier of the base station node that employs TDD technology.

FIGS. 4, 5, and 6 present processes 400, 500, and 600 that relate to operations of the carrier aggregation controller 104. Each of the processes 400, 500, and 600 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400, 500, and 600 are described with reference to the computing environment 100 of FIG. 1.

FIG. 4 illustrates a process for generating scheduling information to allocate a carrier aggregation for an uplink transmission of user plane data. Process 400 is described from the perspective of the carrier aggregation controller that is communicatively coupled to a base station node. In this example, the base station node is configured to support multiple carriers, such as LTE and 5G-NR. The carriers may be within the FR1 or FR2 frequency bands. Further, some carries may employ TDD technology to accommodate downlink and uplink transmissions within the same frequency.

At 402, the carrier aggregation controller may detect receipt of a resource allocation request at a base station node for an uplink transmission of user plane data to a telecommunications network. The resource allocation request may be initiated by a client device within a service area of the base station node.

The resource allocation request may include a client device identifier associated with the client device and an indication of user plane data that is to be transmitted via the base station node. User plane data may include data packets associated with a data file or multimedia streaming content intended for uplink transmission.

At 404, the carrier aggregation controller may analyze the resource allocation request to determine an anticipated network usage associated with the uplink transmission. The anticipated network usage may be defined as a required bandwidth or a number of PRBs required to transmit the user plane data.

In one example, the carrier aggregation controller may determine whether a service priority is associated with the client device. The service priority may be established via an SLA or other contractual mechanism and may indicate a guaranteed bandwidth threshold or guaranteed QoS threshold for uplink transmissions. Here, the carrier aggregation controller may retrieve and analyze a client profile associated with the client device to determine whether a service priority exists. The client profile may be retrieved via the telecommunications network based on the client device identifier included within the resource allocation request.

At 406, the carrier aggregation controller may analyze the available carriers to determine a carrier aggregation for the uplink transmission. The carrier aggregation may comprise of intra-band aggregation, inter-band aggregation, or a combination of both. In one example, the carrier aggregation controller may retrieve real-time carrier metadata from the carriers supported by the base station node. The carrier metadata may include indications of real-time uplink physical and control resource utilization for each available carrier. Further, the carrier aggregation controller may employ one or more trained machine-learning algorithms to analyze the carrier metadata and determine a carrier aggregation of two or more carrier components of the available carriers.

Analysis of the carrier metadata may include determining a QoS associated with each available carrier, determining an RSRP and RSRQ of the received radio signal of each available carrier, or a combination of both. Further, the selection of carrier components may be based on analyzing the QoS and RSRP/RSRQ relative to respective predetermined thresholds, namely a predetermined QoS threshold and a predetermined RSRP threshold. The predetermined thresholds may be set by an administrator of the carrier aggregation controller or an operator of the telecommunications network. Further, as discussed above, the predetermined thresholds may be dictated by a service priority assigned to the client device.

At 408, the carrier aggregation controller may generate scheduling information that identifies the carrier aggregation, if implemented, for the uplink transmission of user plane data to the telecommunications network. The scheduling information may identify the carrier components of the carrier aggregation for the uplink transmission of the user plane data. In one example, the scheduling information may further include control information intended for the client device. The control information may configure the client device to use the allocated carrier aggregation for the uplink transmission. Alternatively, the control information may be generated at the base station node, based at least in part on the scheduling information.

FIG. 5 illustrates a process for generating a data model to infer whether to generate a carrier aggregation for an uplink transmission of user plane data. Process 500 is described from the perspective of the carrier aggregation controller. Further, process 500 describes generating a data model that analyzes network usage and carrier resource utilization over a predetermined time interval. In alternative embodiments, the carrier aggregation controller may generate two data models, namely a network usage data model and carrier utilization data model. The network usage data model may be configured to infer whether to employ a carrier aggregation for an uplink transmission of user plane data, and the carrier utilization data model may be used to infer carrier components that make up the carrier aggregation for an uplink transmission.

At 502, the carrier aggregation controller may retrieve, from a data store, historical instances of network usage and historical instances of carrier resource utilization at the base station node over a predetermined time interval. Historical network usage may indicate changes in network load throughout a day, over a week, or in response to regularly scheduled events. With this data, the carrier aggregation controller may infer an anticipated network load across an entire service area of the base station node.

Historical carrier resource utilization may indicate carriers that are typically over-utilized, under-utilized or adequately utilized relative to network load at the base station node. This data set may include an additional level of granularity by differentiating between uplink and downlink resource utilization for each carrier. In this way, for carriers that employ TDD technology, the carrier aggregation controller may infer whether a portion of the frequency dedicated for uplink transmissions is over-utilized, under-utilized, or adequately utilized.

At 504, the carrier aggregation controller may employ one or more trained machine-learning models to generate a data model based on the historical instances of network usage and carrier resource utilization. By correlating network usage and carrier resource utilization, the data model may infer whether a carrier aggregation for an uplink transmission is warranted and if so, further infer a selection of carrier components to make up the carrier aggregation. While the data model is based on historical instances of network usage and carrier resource utilization, as more data becomes available, a more accurate data model can be developed.

At 506, the carrier aggregation controller may receive a resource allocation request for a real-time uplink transmission of user plane data to a telecommunications network. Here the resource allocation request may be analyzed to determine an anticipated network usage associated with the uplink transmission. The anticipated network usage may be expressed as a bandwidth or a number of PRBs to facilitate the uplink transmission. Further, the carrier aggregation controller may correlate the anticipated network usage with data points of the data model to infer whether to implement a carrier aggregation for the uplink transmission and, if so, infer a selection of the carrier components to make up the carrier aggregation.

An inference to implement a carrier aggregation may be based at least in part on a QoS and/or RSRP metric of the primary carrier assigned to the uplink transmission. If the QoS and/or RSRP is less than a corresponding predetermined threshold, the implementation of a carrier aggregation may be inferred. However, if the QoS and/or RSRP/RSRQ is less than their respective predetermined thresholds, further analysis of the carrier components of a carrier aggregation may consider whether an incremental improvement occurs in QoS and/or RSRP. If no improvement in QoS and/or RSRP/RSRQ is inferred via a carrier aggregation, the carrier aggregation controller may infer that the uplink transmission is to occur via the primary carrier, without a carrier aggregation.

If a carrier aggregation is inferred, the carrier aggregation controller may correlate the real-time carrier resource utilization with data points of the data model to infer carrier components of the carrier aggregation. It is noteworthy that the use of the real-time carrier resource utilization may also inform whether to implement a carrier aggregation, as discussed above with reference to inferring an incremental improvement in QoS and/or RSRP.

At 508, the carrier aggregation controller may generate scheduling information that identifies the carrier aggregation, if implemented, for the uplink transmission of user plane data to the telecommunications network. The scheduling information may identify the carrier components of the carrier aggregation. These may include carriers that employ TDD technology, such that the portion of frequency dedicated to uplink transmissions—based on the TDD ratio— would be allocated as a carrier component of the carrier aggregation. The scheduling information may be transmitted to the base station node associated with the resource allocation request. Here, the base station node may interact with the client device that initiated the resource allocation request to schedule the uplink transmission to the telecommunications network.

FIG. 6 illustrates a process for generating a recommendation to update a time division duplexing (TDD) ratio for a carrier of the base station node that employs TDD technology. Process 600 is described from the perspective of the carrier aggregation controller. The carrier aggregation controller is communicatively coupled to a base station node and therefore may detect and analyze the base station node carrier resource utilization. In this way, the TDD ratio for carriers that employ TDD technology may be optimized to ensure that bandwidth dedicated for uplink and downlink transmissions are not underutilized due to an inappropriately skewed TDD ratio.

For example, a current TDD ratio may allocate 85% of a carrier frequency to downlink transmissions and 15% to uplink transmissions. If an analysis of the carrier indicates that the 85% portion for downlink transmission is under-utilized and the 15% portion for uplink transmissions is over-utilized, the carrier aggregation controller may infer an updated TDD ratio that more evenly balances the utilization needs for uplink and downlink transmissions. By way of example, the updated TDD ratio may infer a 70% to 30% split between downlink and uplink transmissions. The additional 15% allocation for uplink transmission may appease an over-utilization, while the reduction of 15% for downlink transmissions may have a nominal impact due to its initial under-utilization.

At 602, the carrier aggregation controller may retrieve, from a data store, a data model associated with uplink transmissions at a base station node. The data model may be a carrier utilization data model, which is based on historical instances of carrier resource utilization at the base station node. Alternatively, the data model may be based on a combination of network usage and carrier utilization as described earlier as a meta-data model and with reference to process 500.

At 604, the carrier aggregation controller may employ one or more machine-learning algorithms to infer an updated TDD ratio for carriers that employ the TDD technology, based at least in part on the data model. In this regard, the carrier aggregation controller may identify, carriers that employ TDD technology, and within a given carrier, detect an underutilization of resources for downlink transmission and an overutilization of resources for uplink transmissions. In this way, the carrier aggregation controller may infer an updated TDD ratio. The updated TDD ratio is intended to reduce the resource allocation for downlink transmissions, which addresses the underutilization of resources for downlink transmissions. At the same time, the updated TDD ratio dedicates those same resources to uplink transmissions, which were identified as being overutilized. Thus, a current TDD ratio of 85%-15% (downlink-uplink) may become an updated TDD ration of 70%-30%.

At 606, the carrier aggregation controller may generate a message for delivery to the base station node to adjust a current TDD ratio to an updated TDD ratio. In some instances, the recommendation may also include an updated TDD ratio for a carrier that does not currently implement a TDD ratio but is capable of doing so. In this regard, rather than an update of TDD ratio, the message may outline an introduction of TDD ratio at the given TDD ratio.

In one example, the message may comprise a recommendation to adjust the current TDD ratio to an updated TDD ratio or introduce a TDD ratio to a carrier. Here, an operator of the base station node is required to selectively implement the recommendation. In another example, the message may include computer-executable instructions that automatically execute an adjustment of a current TDD ratio to an updated TDD ratio or an introduction of a TDD ratio to a carrier.

In some examples, an automatic adjustment of the TDD ratio may be based on a confidence score inferred by the carrier aggregation controller. For example, the carrier aggregation controller may infer a confidence score based on the bifurcation of resource utilization (i.e. under-utilization vs over-utilization) between downlink transmissions and uplink transmissions. If the confidence score is greater than a predetermined confidence threshold, the carrier aggregation controller may generate computer-executable instructions that automatically adjust the current TDD ratio to an updated TDD ratio or introduce a TDD ratio to a carrier. Referring to the latter, the confidence score may be based on the degree of underutilization of the carrier for downlink transmissions.

Conclusion

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A computer-implemented method, comprising:
   retrieving historical instances of network usage and historical instances of carrier resource utilization at a base station node;
   based on the historical instances of network usage and the historical instances of carrier resource utilization at the base station node, generating a data model;
   receiving a resource allocation request for an uplink transmission of user plane data to a telecommunications network;
   determining to implement a carrier aggregation for the uplink transmission using the data model; and
   generating scheduling information that identifies non-contiguous frequency ranges for the carrier aggregation for the uplink transmission.

2. The method of claim 1, comprising:
   based on the historical instances of network usage and the historical instances of carrier resource utilization at the base station node, generating an additional data model; and
   determining the non-contiguous frequency ranges for the carrier aggregation for the uplink transmission using the additional data model.

3. The method of claim 1, wherein the historical instances of network usage comprise data indicating network usage in response to scheduled events.

4. The method of claim 1, wherein the historical instances of carrier resource utilization comprise data indicating various carriers are over-utilized, under-utilized or adequately utilized relative to network load at the base station node.

5. The method of claim 1, wherein the historical instances of carrier resource utilization comprise data indicating whether various carriers were used for uplink transmissions or downlink transmissions.

6. The method of claim 1, wherein generating the data model comprises generating, using a machine learning-trained model, the data model.

7. The method of claim 1, wherein generating the scheduling information that identifies the non-contiguous frequency ranges for the carrier aggregation for the uplink transmission comprises generating, using the data model, the scheduling information that identifies the non-contiguous frequency ranges for the carrier aggregation for the uplink transmission.

8. The method of claim 1, comprising:
retrieving additional historical instances of network usage and additional historical instances of carrier resource utilization at the base station node; and
updating the data model based on the additional historical instances of network usage and the additional historical instances of carrier resource utilization at the base station node.

9. The method of claim 1, comprising:
based on the resource allocation request for the uplink transmission of the user plane data to the telecommunications network, determining an anticipated network usage associated with the uplink transmission that specifies an anticipated bandwidth usage or an anticipated number of physical resource blocks to facilitate the uplink transmission,
wherein determining to implement the carrier aggregation for the uplink transmission is based on the anticipated network usage associated with the uplink transmission, and
wherein generating the scheduling information that identifies the non-contiguous frequency ranges for the carrier aggregation for the uplink transmission is based on the anticipated network usage associated with the uplink transmission.

10. The method of claim 1, comprising:
determining a quality of service or a reference signal received power of a primary carrier assigned to the uplink transmission;
comparing the quality of service to a quality of service threshold; and
comparing the reference signal received power to a reference signal received power threshold,
wherein determining to implement the carrier aggregation for the uplink transmission using the data model is based on the quality of service satisfying the quality of service threshold or the reference signal received power satisfying the reference signal received power threshold.

11. The method of claim 1, comprising:
providing, for output to the base station node, the scheduling information.

12. A carrier aggregation controller, comprising:
one or more processors; and
memory coupled to the one or more processors, the memory including one or more modules that are executable by the one or more processors to perform the acts comprising:
retrieving historical instances of network usage and historical instances of carrier resource utilization at the base station node;
based on the historical instances of network usage and the historical instances of carrier resource utilization at the base station node, generating a data model;
receiving a resource allocation request for an uplink transmission of user plane data to a telecommunications network;
determining to implement a carrier aggregation for the uplink transmission using the data model; and
generating scheduling information that identifies non-contiguous frequency ranges for the carrier aggregation for the uplink transmission.

13. The carrier aggregation controller of claim 12, wherein the acts comprise:
based on the historical instances of network usage and the historical instances of carrier resource utilization at the base station node, generating an additional data model; and
determining the non-contiguous frequency ranges for the carrier aggregation for the uplink transmission using the additional data model.

14. The carrier aggregation controller of claim 12, wherein the historical instances of network usage comprise data indicating network usage in response to scheduled events.

15. The carrier aggregation controller of claim 12, wherein the historical instances of carrier resource utilization comprise data indicating various carriers are over-utilized, under-utilized or adequately utilized relative to network load at the base station node or data indicating whether various carriers were used for uplink transmissions or downlink transmissions.

16. The carrier aggregation controller of claim 12, wherein generating the scheduling information that identifies the non-contiguous frequency ranges for the carrier aggregation for the uplink transmission comprises generating, using the data model, the scheduling information that identifies the non-contiguous frequency ranges for the carrier aggregation for the uplink transmission.

17. The carrier aggregation controller of claim 12, wherein the acts comprise:
retrieving additional historical instances of network usage and additional historical instances of carrier resource utilization at the base station node; and
updating the data model based on the additional historical instances of network usage and the additional historical instances of carrier resource utilization at the base station node.

18. The carrier aggregation controller of claim 12, wherein the acts comprise:
based on the resource allocation request for the uplink transmission of the user plane data to the telecommunications network, determining an anticipated network usage associated with the uplink transmission that specifies an anticipated bandwidth usage or an anticipated number of physical resource blocks to facilitate the uplink transmission,
wherein determining to implement the carrier aggregation for the uplink transmission is based on the anticipated network usage associated with the uplink transmission, and
wherein generating the scheduling information that identifies the non-contiguous frequency ranges for the carrier aggregation for the uplink transmission is based on the anticipated network usage associated with the uplink transmission.

19. The carrier aggregation controller of claim 12, wherein the acts comprise:
determining a quality of service or a reference signal received power of a primary carrier assigned to the uplink transmission;
comparing the quality of service to a quality of service threshold; and comparing the reference signal received power to a reference signal received power threshold,
wherein determining to implement the carrier aggregation for the uplink transmission using the data model is based on the quality of service satisfying the quality of service threshold or the reference signal received power satisfying the reference signal received power threshold.

20. A computer-implemented method, comprising:

receiving, by a base station and from a client device, a resource allocation request for an uplink transmission of user plane data;

generating, by the base station, carrier metadata that indicates available carriers and whether the available carriers are downlink resources, uplink resources, or both downlink and uplink resources;

receiving, by the base station, scheduling information that indicates carrier aggregation of two or more of the available carriers;

based on the scheduling information, generating, by the base station, control information that instructs the client device how to use the carrier aggregation of the two or more available carriers; and providing, for output by the base station and to the client device, the control information.

* * * * *